United States Patent
Rabinovich et al.

[11] Patent Number: 5,818,331
[45] Date of Patent: Oct. 6, 1998

[54] AUTOMOTIVE LIGHT SIGNAL ALLOWING A FAILURE-PROOF END-TO-END OPERABILITY CHECKING

[76] Inventors: Semyon Rabinovich, 7705 Romaine St. #6, Los Angeles, Calif. 90046; Michael Rabinovich, 55 Cottage Pl., Gillette, N.J. 07933

[21] Appl. No.: 764,092

[22] Filed: Dec. 6, 1996

[51] Int. Cl.⁶ .................................................. B60Q 1/00
[52] U.S. Cl. ..................... 340/438; 340/458; 340/479; 362/80.1
[58] Field of Search ................. 340/438, 479, 340/468, 641, 642, 458, 471, 463, 464; 362/80.1, 83.1

[56] References Cited

U.S. PATENT DOCUMENTS

| | | | |
|---|---|---|---|
| 1,099,751 | 6/1914 | Kilburn | 340/458 |
| 1,552,188 | 9/1925 | Atkinson | 340/458 |
| 2,743,431 | 4/1956 | Wright | 340/458 |
| 3,569,933 | 3/1971 | Longenecker et al. | 340/458 |
| 5,571,277 | 11/1996 | Allred et al. | 340/479 |

*Primary Examiner*—Jeffery A. Hofsass
*Assistant Examiner*—Anh La

[57] ABSTRACT

The invention is directed to an automotive light signal which comprise a housing with at least one electric bulb inside. According to the invention, a portion of light emission from the signal is diverted in such a way that the driver can see the same light that is directed outside the vehicle. Thus, a failure-proof end-to-end check of the operability of the signal is accomplished by the driver without resorting to help of another person. The invention is especially important for brake and backing signals, which currently require the driver to request outside help to perform end-to-end checking.

3 Claims, 3 Drawing Sheets

AUTOMOTIVE LIGHT SIGNAL ALLOWING A FAILURE-PROOF END-TO-END OPERABILITY CHECKING

BACKGROUND OF THE INVENTION

Among all light signals in motor vehicle, the brake and backing signals cannot be checked by a driver without help of another person. It is the main reason why so many cars and other motor vehicles on the road are driven with one or maybe even two dead brake signals. A failure of brake signals is a source of collisions on the roads. Therefore some expensive models of cars have dash board indicator to indicate if a bulb in a brake signal burnt-out. These indicators are expensive. Moreover, they still do not provide the end-to-end checking of signals operability and therefore they are not absolutely reliable.

The brake signals are of vital importance. In order to increase a probability to have at least one brake signal in a car in working condition, manufacturers began to equip motor vehicles with an additional brake signal attached to their rear window or trunk cover. Such a brake signal is for example known from U.S. Pat. No. 4,575,782. Those motor vehicles have three brake signals. But as it was before, none of the brake signals can be checked end-to-end by the driver himself. Therefore the driver cannot be sure that brake signals in his/her motor vehicle are in the working condition.

Thus, it would be very useful to provide the brake signals with an end-to-end failure-proof checking capability by the driver without help of another person. The same is true for backing signals. This invention solves these problems.

SUMMARY OF INVENTION

Automotive light signals comprise a housing and an insert with at least one electric bulb or another source of light inside. According to the invention, a portion of light emission from the source of light inside the signal is diverted in such a way that the driver can see the same light that is directed outside the vehicle. Thus, a failure-proof end-to-end check of the operability of the signal is accomplished by the driver without resorting to help of another person.

DETAILED DESCRIPTION OF INVENTION

In accordance with the invention, a portion of light emission from said bulb or another source of light inside an automotive light signal is diverted to the driver, allowing the driver to see whether or not said bulb is burning. Diverting a portion of light emission can be accomplished in a variety of ways.

Figure 1:
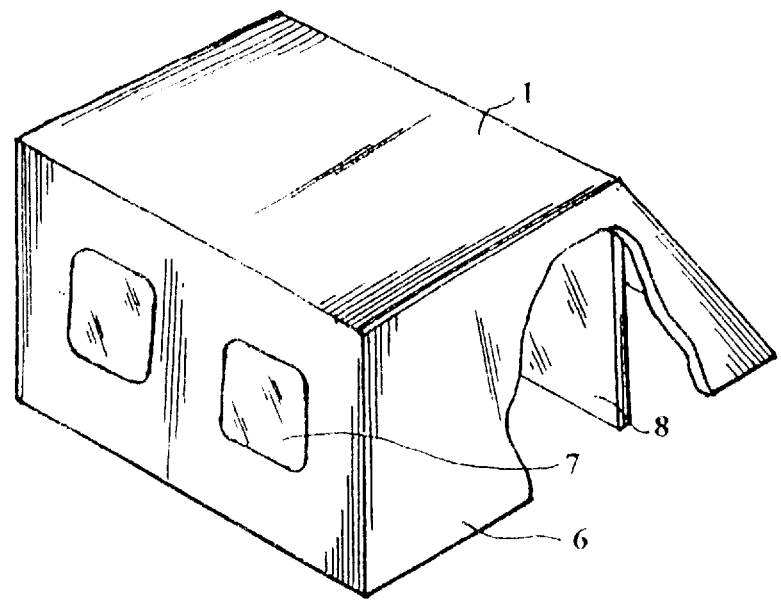
FIG. 1 is a perspective view of a preferred embodiment of the automotive light braking signal housing and the insert according to the present invention.
Figure 1:
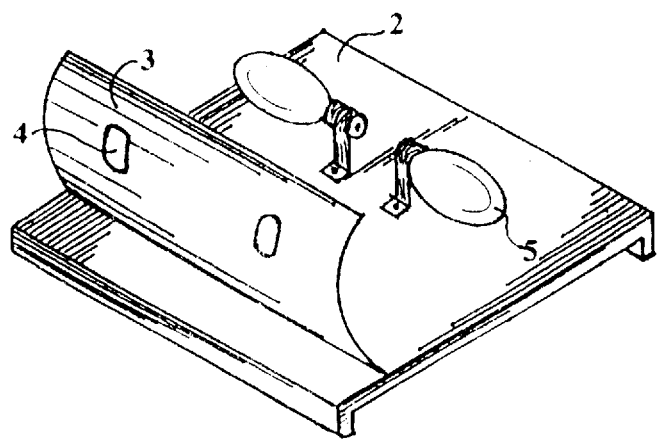

In one embodiment, FIG. 1 shows a brake signal that is intended to be fastened close to a motor vehicle's rear window so it housing is visible to the driver. This signal consists of a housing 1 and an insert 2. The insert carries source of light, for example, two bulbs 5 (there can be just one or more than two bulbs as well). An optional reflector 3 increases the light flux in working direction of the signal.

The housing is easy to put on the insert or to pull it off in order to change a burnt-out bulb. In working position, the housing covers the insert.

The reflector 3 is provided with one or more openings 4, and the housing's back wall 6 has window or windows 7 with glass or other transparent material (or with nothing at all).

When a driver brakes, the bulbs in the signal box shine as usual through a window 8 and a part of their emission comes though the openings 4 in the reflector 3 to the windows 7 in the housing, and the driver can see this light. If the bulbs are shining, the driver can be absolutely sure that the brake signal in his/her motor vehicle is in order. If a bulb burns-out, the driver sees that and can change the burnt-out bulb as soon as possible.

The ability for a driver to perform end-to-end checking of the brake signal while driving eliminates the probability of driving a motor vehicle without knowledge about the condition of its brake signal.

Figure 2:
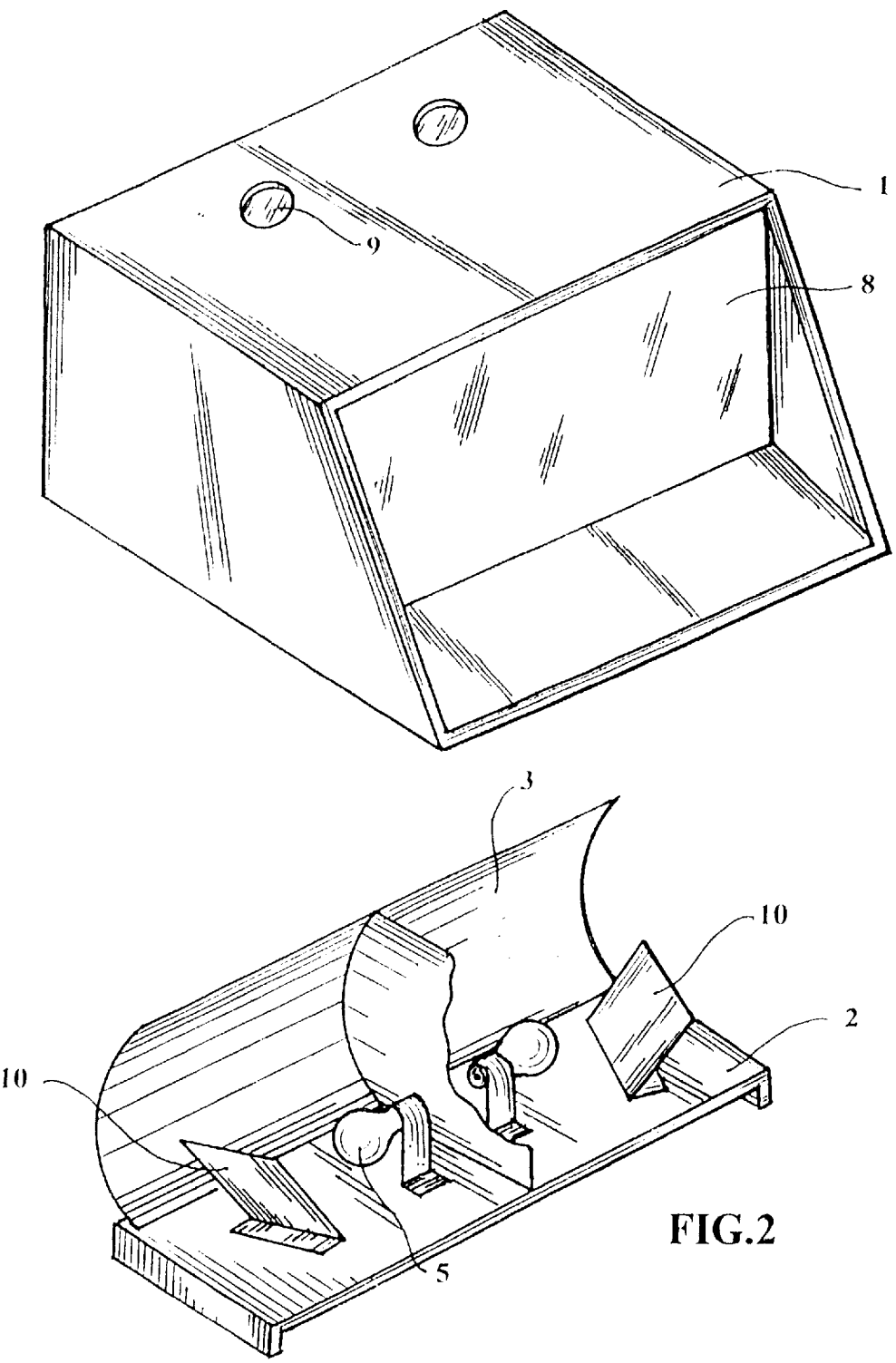
FIG. 2 is a perspective view of the automotive light signal housing and the insert with mirrors according to the present invention reflecting light image to an area of the motor vehicle where the driver can see it.
Figure 3:
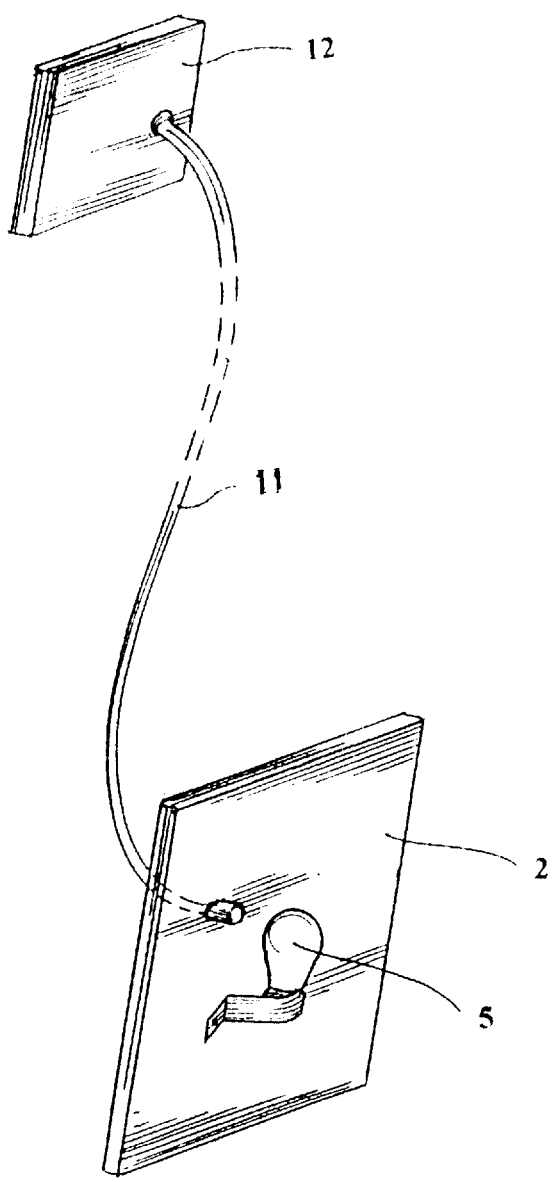

In another embodiment, FIG. 2 shows a brake signal whose location in a motor vehicle does not allow the driver to see its housing. Now, the housing 1 is provided with lenses 9, and the insert 2 has mirrors 10 so that the light from bulbs 5 in the light signal can be seen by the driver on the ceiling or on other parts of the motor vehicle or even on a special screen mounted on the motor vehicle. Lenses 9 can be fastened on the insert 2 instead of the housing 1 or they can be avoided at all. FIG. 3 is a perspective view of the insert of the automotive light signal with fiber-optic light conduit according to the present invention.

We claim:

1. An automotive light braking signal for placement at the rear window of motor vehicles or on the cover of their trunks, which comprises a housing with a window directed to the rear of a motor vehicle and an insert that carries a socket assembly with at least one electrical bulb or another source of light and a reflector behind it, said housing provided with openings and lenses on the top portion of said housing and said insert provided with mirrors reflecting light to said lenses so that a driver can see light spots on the ceiling or other parts of the motor vehicle when said source of light in said light signal is burning.

2. The automotive light braking signal of claim 1, wherein said lenses covering said opening (s) are colored to make light spots more visible to driver.

3. The automotive light braking signal of claim 1 in which each bulb or another source of light is provided with a separate mirror and a separate lens so that a driver can see separate light spots on the ceiling or another parts of the motor vehicle generated by each said bulb or another source of light separately when said sources of light in said light signal are burning.

* * * * *